United States Patent Office 3,178,862
Patented Apr. 20, 1965

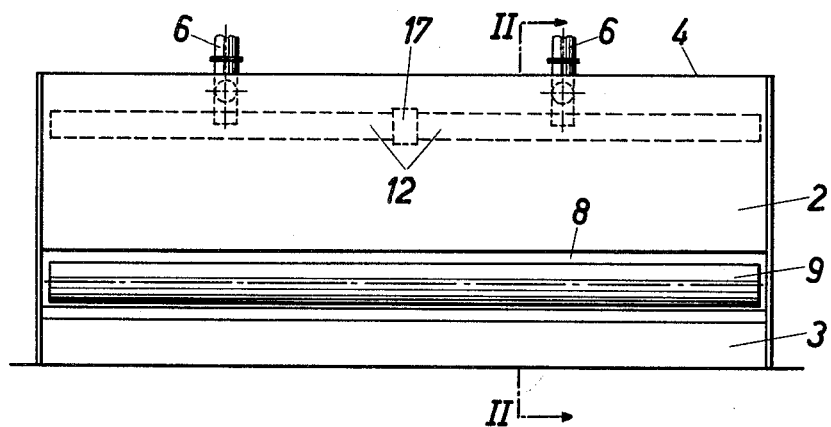
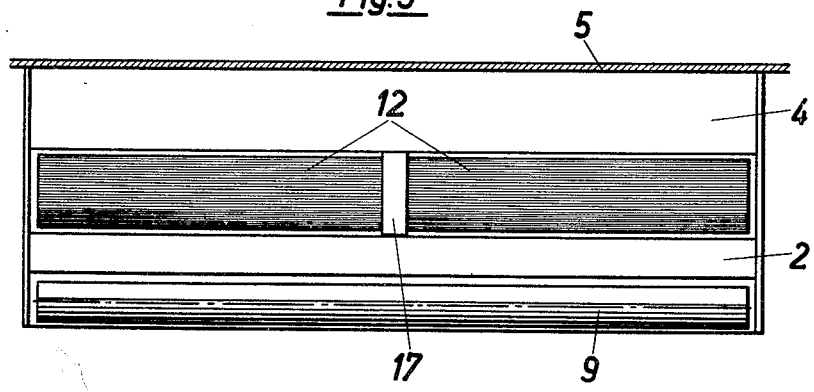
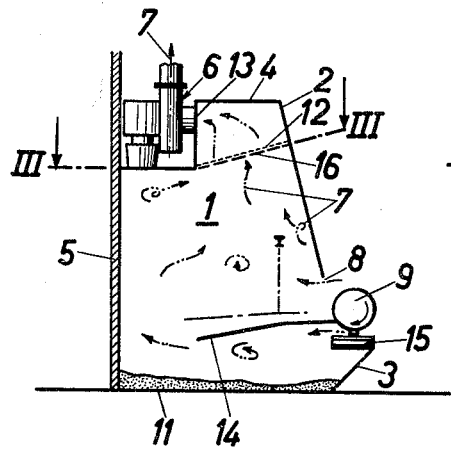

3,178,862
APPARATUS FOR SUCKING-OFF AND COLLECTING DUST
Karlheinz Tinti, Leoben, and Herbert Waclawiczek, Leoben-Hinterberg, Austria, assignors to Othmar Ruthner, Vienna, Austria
Filed July 14, 1961, Ser. No. 124,179
Claims priority, application Austria, July 14, 1960, A 5,427/60
4 Claims. (Cl. 51—273)

The invention relates to an apparatus for sucking-off and subsequently collecting dust from movable dust sources, such as centerless grinders for grinding semi-finished metal articles and the tools used in scarfing plants and oxy-acetylene cutting plants, or the like.

A plurality of operations in industry and trade involve a development of dust. It is obvious that the resulting dust should be removed as far as possible in order to avoid health damage to the operators and for various other reasons, e.g. to avoid an excessive soiling of the machines and premises with and in which these operations are performed. A most complete dust removal is also desirable because such dust can be re-smelted if it consists of metal. The amounts of dust may be considerable. For instance, some tons of dust may be obtained per day in billet grinding shops.

Particularly in connection with movable dust sources, such as centerless grinders, which are used for grinding semifinished metal articles, and the tools used in scarfing plants, oxy-acetylene cutting plants and the like, a removal of the dust formed in the operation of these machines or plants involves difficulties. In oxyacetylene cutting installations, the dust source is disposed at the position of the burner and travels with the same. The dust consists, in this case, of the combustion products which are produced by the burning of the metal at the cut and which is thrown out of the parting line in the metal plate under the high oxygen pressure. Various methods and plants for dust removal have been proposed, which are based on dry dust collection, wet dust collection or electric dust collection. Particularly in conjunction with movable dust sources, none of the previously proposed methods and apparatuses have fully met the requirements to be fulfilled. Three aspects must be considered in the removal of dust, namely, the receiving of the dust from its point of formation (sucking-off), the feeding of the dust from its point of formation to the dust collector by means of a gas or air stream (feeding), and the collection of the dust from the gas-dust mixture (precipitation). Dry dust collection methods are most widely used owing to their inherently favorable efficiency and relatively low installation costs. In these methods the removal of the dust is effected by sucking through a funnel or by arranging the dust source in a closed chamber, from which the dust can be sucked. This sucking-off can be performed most easily, of course, if the dust source is stationary and the dust is ejected in a certain direction. In most of these cases the dust collector can be disposed directly beside the dust source and the feeding is effected in pipelines. In the case of movable dust sources, it is attempted to effect the feeding in flexible tubes or according to the air funnel system using a liquid seal.

The collection of the dust is effected by means of centrifugal separators or by means of cloth and metal filters or by causing the dust to settle by gravity in dust chambers.

The provision of suction funnels involves the disadvantage that only that portion of the dust is collected which is directly thrown into the funnel. Another disadvantage resides in that the funnel and the flexible tubes required for a movable dust source and the manifold are highly worn by scaling and abrasion. Besides, coarse dust tends to settle in the tubes and manifolds and may clog the feed conduits so as to reduce the suction capacity. The fans and cyclone separators are also subjected to a high abrasive wear. In addition, the cyclone separators eliminate only coarse and medium dusts whereas the fine and finest dusts are blown out into the air.

For this reason these known dust removal apparatuses will not accomplish a complete dust removal and the operators must still operate under dust masks.

It is an object of the present invention to provide an apparatus for dust removal in which the disadvantages of the known apparatuses are avoided.

The invention provides apparatus for sucking-off and subsequently collecting dust from movable dust sources, comprising a settling chamber for dust particles, an opening extending along the entire dust source and the path of movement of the dust creating tool and adapted to receive the dust particles, said opening directly adjoining said chamber, means for generating an air stream through said chamber, and means for causing at least a portion of the dust to settle in said chamber.

Another feature of the invention resides in that said opening of the chamber is disposed in the lower portion of a front wall thereof.

A further feature of the invention resides in that at least one cross-section of the chamber, which cross-section extends generally at right angles to the general flow of air, is a multiple of the area of said opening.

Finally, it is a feature of the invention to provide deflecting surfaces for the flowing air in said chamber, which deflecting surfaces are formed by at least a portion of the walls of said chamber and an oblique guide plate extending from said opening downwardly into the interior of said chamber.

An illustrative embodiment of the invention is diagrammatically shown by way of example in the drawing.

FIG. 1 of the drawing is a front view showing an apparatus according to the invention, FIG. 2 is a sectional view taken on line II—II of FIG. 1 and FIG. 3 is a sectional view taken on line III—III of FIG. 2.

In the drawing, 1 denotes a dust settling or swirling chamber. This chamber may have, e.g., a length of 8 meters, a width of 3 meters and a height of 4½ meters. The front wall consisting of wall portions 2, 3 and the top wall 4 may be formed of sheet metal. The rear wall 5 consists in the present case of a shed wall. The top 4 of this chamber 1 carries two suction blowers 6, which generate an air stream in the direction of the arrows 7.

The wall portions 2 and 3 of the chamber are inclined. The chamber 1 widens from top to bottom adjacent to the wall portion 2 and narrows in the same direction adjacent to the wall portion 3. Between the wall portions 2 and 3, a slot 8 is provided in the lower portion of the chamber 1. This slot is 0.8 meter high and 8 meters wide and is directly connected to the dust source, without connecting hose. In the present case, the dust source consists of a centerless grinder 9 which serves, e.g., for billet-grinding. The slot 8 extends throughout the length of the centerless grinder. In the vertical direction, the cross-section of the chamber 1 adjoining the slot has an area which is a multiple of the area of the slot 8 so that the velocity of the air sucked by the suction blowers through the slot is substantially reduced behind the slot.

In the upper portion of the chamber 1, where the cross-sectional area is also a multiple of the area of the slot 8, an air filter 12 is provided. This consists suitably of a cloth filter, which is protected against burning by a spark-protection grid 16. The filter is provided with a diagrammatically indicated rapping device 17 for periodic cleaning. The wrapping device 17 may comprise any suitable means disposed to strike or wrap the cloth filter.

In the chamber 1, a flow guide plate 14 is provided next to the slot 8. 15 is the work rest.

The described device operates as follows: The blowers 6 suck air from the chamber 1 to cause an air stream to enter the chamber through the slot 8. This air stream receives the dust particles at the centerless grinder 9 and carries them into the closed chamber 1. The velocity of flow of the air through the slot 8 may be about 0.4 meter/second. Since the cross-section of flow in the chamber 1 is larger than the cross-section of flow in the slot 8, the velocity of flow is greatly reduced in the chamber 1. This enables a portion of the dust generated by the centerless grinder to settle downwardly against the air flow. This portion comprises substantially only the coarse and medium dust. They collect on the bottom 11 of the dust collecting chamber and may be removed from here by an opening (not shown) in the side wall. This settling is promoted by a swirl, which is imparted to the air by the guide plate 14 and the walls 5, 2 and 3 of the dust settling chamber 1.

The fine and finest dust particles are carried further upwardly by the air stream in the chamber and reach in the uppermost portion of the chamber 1 a filter 12, which retains them.

The air from which the dust has been removed is blown out by the suction blowers 6 in the direction of the arrow 7.

In the apparatus according to the invention, all three aspects of dust removal, namely, sucking-off, feeding and precipitating, are combined in one unit. The elimination of the dust nuisance enables a considerable increase in output.

Sucking-off is effected in a large area throughout the working range of the dust source. The feeding is already terminated with the admission to the closed chamber consisting of a dust settling chamber so that the feed path is only a few centimeters. The collection of the dust in the dust settling chamber is effected by gravity. This gravity separation is promoted by an enforced swirl.

It is obvious that the size of the settling chamber and its parts depend on the working range of the dust source.

An important feature of the invention resides in that the feed path from the dust source to the beginning of the collection is only a few centimeters and feeding is effected without a conduit and at a velocity below 1 meter/second.

A plurality of the dust removal units shown in the drawing may be laterally interconnected to form a combined large dust removal plant.

What is claimed is:

1. Apparatus for sucking-off and subsequently collecting dust from movable dust sources, comprising a settling chamber for the dust particles, the said chamber being enclosed by walls, an outlet in the upper part of said chamber and an opening for receiving the dust particles, the said opening being disposed in the lower portion of a wall of said chamber and extending substantially the full length of said wall and along the entire dust source and its path of movement, said opening directly adjoining said chamber, means for generating an air stream through said chamber upwards from the bottom, an oblique guide plate extending inwardly and downwardly into the interior of said chamber from said opening for causing at least a portion of the dust to settle in said chamber, and means for filtering the air flowing through said chamber to said outlet.

2. Apparatus for sucking-off and subsequently collecting dust from movable dust sources, comprising a settling chamber for the dust particles, the said chamber being enclosed by walls, an outlet in the upper portion of said chamber and an opening for receiving the dust particles, the said opening being disposed in the lower portion of a front wall of said chamber, said opening directly adjoining said chamber and extending substantially the full length of said front wall and along the entire dust source and its path of movement, means for generating an air stream through said chamber upwards from the bottom, an oblique guide plate extending inwardly and downwardly into the interior of said chamber from said opening for causing at least a portion of the dust to settle in said chamber, means for filtering the air flowing through said chamber to said outlet, said filtering means being disposed in a cross section of the upper part of said chamber extending substantially at right angles to the air stream and being a multiple of the area of said opening.

3. Apparatus for sucking-off and subsequently collecting dust from movable dust sources, comprising a settling chamber for the dust particles, the said chamber being enclosed by walls, an outlet in the upper part of said chamber and an opening for receiving the dust particles, said opening being disposed in the lower portion of a front wall of said chamber and extending substantially the full length of said front wall and along the entire dust source and its path of movement, an oblique guide plate extending inwardly and downwardly into the interior of said chamber from said opening for causing at least a portion of the dust to settle in said chamber, and at least one deflecting surface for the flowing air being formed by at least a portion of a front wall of said chamber, said portion of the front wall being inclined upwardly from the top of said opening and spaced above said guide plate.

4. Apparatus for sucking-off and subsequently collecting dust from movable dust sources, comprising a settling chamber for the dust particles, the said chamber being enclosed by walls, an outlet in an upper part of the chamber an an opening for receiving the dust particles, said opening being disposed in the lower portion of a front wall of said chamber and extending substantially the full length of said front wall and along the entire dust source and its path of movement, means for generating an air stream through said chamber upwards from the bottom to said outlet, an oblique quide plate extending inwardly and downwardly into the interior of said chamber from said opening for causing at least a portion of dust to settle in said chamber, means for filtering the air flowing through said chamber to said outlet, said filtering means being disposed in a cross section of the upper part of said chamber extending at right angles to the air stream and being a multiple of the area of said opening, said filtering means comprising a cloth filter, a rapping device for periodically rapping said cloth filter, and a spark protection grid for protection of said cloth filter from burning.

References Cited by the Examiner

UNITED STATES PATENTS

| 1,357,308 | 11/20 | Bertschinger | 51—273 |
|---|---|---|---|
| 2,225,225 | 12/40 | McElevey | 51—273 |
| 2,291,550 | 7/42 | Heinichen | 51—273 X |
| 2,301,351 | 11/42 | Willmott | 51—273 X |
| 2,384,414 | 9/45 | Antrim | 51—273 X |
| 2,507,042 | 5/50 | Osborn. | |
| 2,629,209 | 2/53 | Miller | 51—273 X |
| 2,683,958 | 7/54 | Schneible et al. | 51—273 |

FOREIGN PATENTS 241,626  10/25  Great Britain.

LESTER M. SWINGLE, *Primary Examiner.*

JOHN C. CHRISTIE, CHARLES A. WILLMUTH,
*Examiners.*